INVENTOR.
RICHARD W. STEINBERG
BY
Merchant, Merchant & Gould
ATTORNEYS

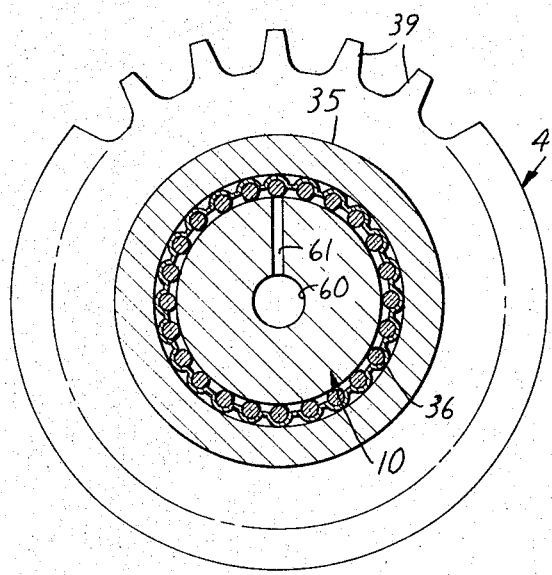
Fig. 3
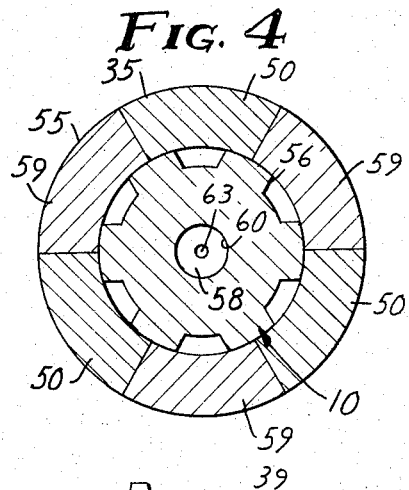
Fig. 4
Fig. 5
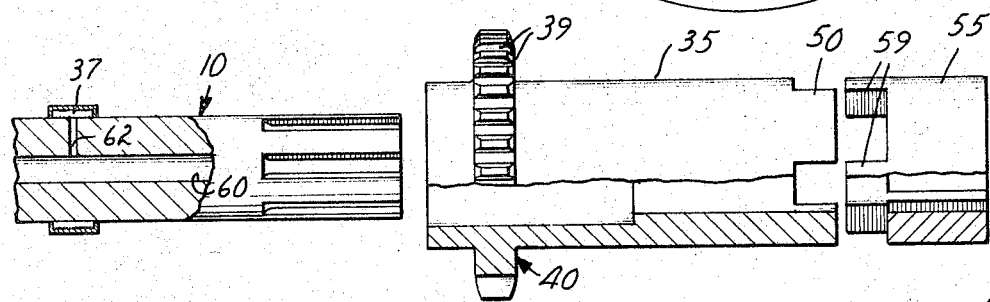
Fig. 6
INVENTOR.
RICHARD W. STEINBERG
BY
Merchant, Merchant & Gould
ATTORNEYS

United States Patent Office 3,301,366
Patented Jan. 31, 1967

3,301,366
CLUTCH MECHANISM HAVING SHAFT
ACTUATING MEANS
Richard W. Steinberg, Owatonna, Minn., assignor to
Owatonna Manufacturing Company, Inc., Owatonna,
Minn., a corporation of Minnesota
Filed Feb. 12, 1965, Ser. No. 432,362
2 Claims. (Cl. 192—96)

This invention pertains to a new and improved clutch mechanism and more specifically to apparatus for transmitting rotary motion from a shaft to a sprocket or the like in which said shaft may be moved into engagement with said sprocket with a minimum of effort and wear.

In prior art devices clutch mechanisms of the type described are generally constructed so that the surfaces moving relative to each other are extremely hard to obtain access to and in some instances only bushings are used rather than bearings of the ball or roller type. Because of these inaccessible moving surfaces the prior art clutch mechanisms were highly susceptible to wear and the like. Also, many of the parts in these prior art clutch mechanisms must have very low tolerances in the manufacturing thereof because of their close proximity to non-moving parts and, therefore, the production of these prior art clutch mechanisms is relatively costly and difficult.

In the present clutch mechanism a shaft, which is being rotated at some desired speed, is mounted for limited axial movement. A sleeve is rotatably mounted coaxial with the shaft by means of bearings between the shaft and the sleeve and between the sleeve and an outer mounting means or frame. One end of the sleeve has axial teeth cut therein and some means, such as a sprocket, are fixedly attached to the outer periphery thereof for transmitting rotary motion therefrom. A drive cup is fixedly attached to one end of the shaft and rotates therewith. The inner end of the drive cup has teeth cut therein which are adapted to mate with the teeth in the end of the sleeve. A bifurcated rod engages the other end of the shaft and moves it so that the teeth in the drive cup mesh with the teeth in the sleeve in a first position and the teeth in the drive cup are separated from the teeth in the sleeve in the second position. Therefore, by manipulating the bifurcated rod an operator can cause the sprocket on the sleeve to rotate with the shaft or to be stationary.

A longitudinal passage extending from one end of the shaft to the central portion thereof is provided with a lubricating fitting at the outer end of the passage for lubricating the bearings in the sleeve. Radial passages communicating with the longitudinal passage at their inner end and with the bearings in the sleeve at their outer end are provided to transport the lubricant to the bearings. Because of the unique construction of the lubricating system and because of the unique assembly of the various parts and their relationship to each other the present clutch mechanism is highly reliable, has relatively low wear, and is relatively simple and inexpensive to construct.

It is an object of the present invention to provide an improved clutch mechanism.

A further object of the present invention is to provide a clutch mechanism which is simple and inexpensive to produce.

A further object of the present invention is to provide a clutch mechanism with a positive lubricating system which greatly increases the life of the clutch mechanism.

These and other objects of this invention will become apparent to those skilled in the art upon consideration of the accompanying specification, claims, and drawings.

Referring to the drawings wherein like characters indicate like parts throughout the figures:

FIG. 3 is an enlarged sectional view as seen along the line 3—3 in FIG. 1;

FIG. 4 is an enlarged sectional view as seen along the line 4—4 in FIG. 1;

FIG. 5 is an enlarged sectional view as seen along the line 5—5 in FIG. 1; and

FIG. 6 is an exploded view of the present clutch mechanism some parts removed and some parts broken away and shown in section.

Figure 1:
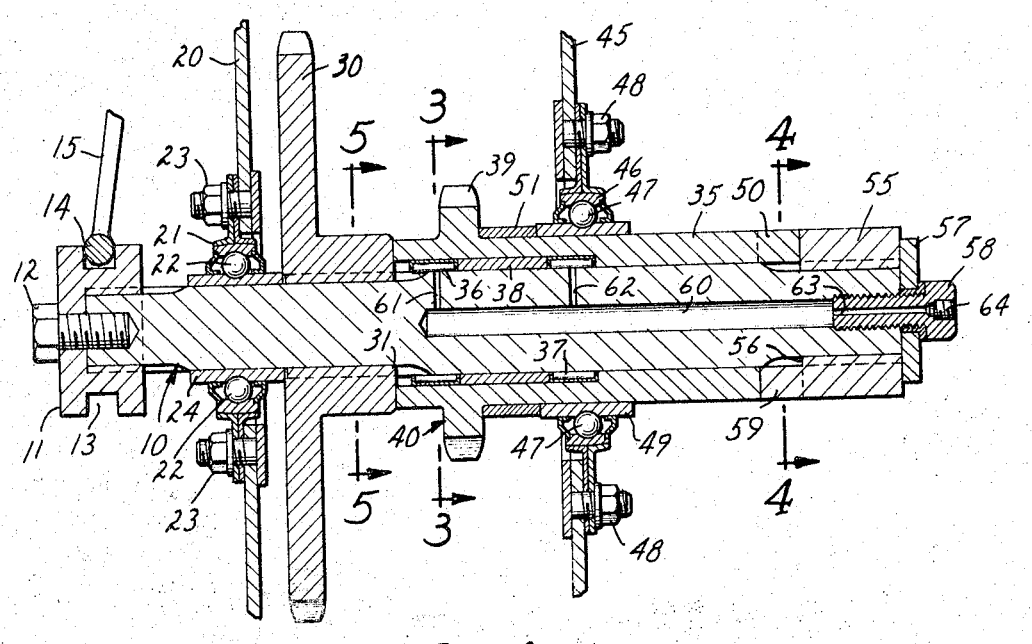
FIG. 1 is an axial sectional view of the present clutch mechanism in the engaged position, some parts broken away.
Figure 2:
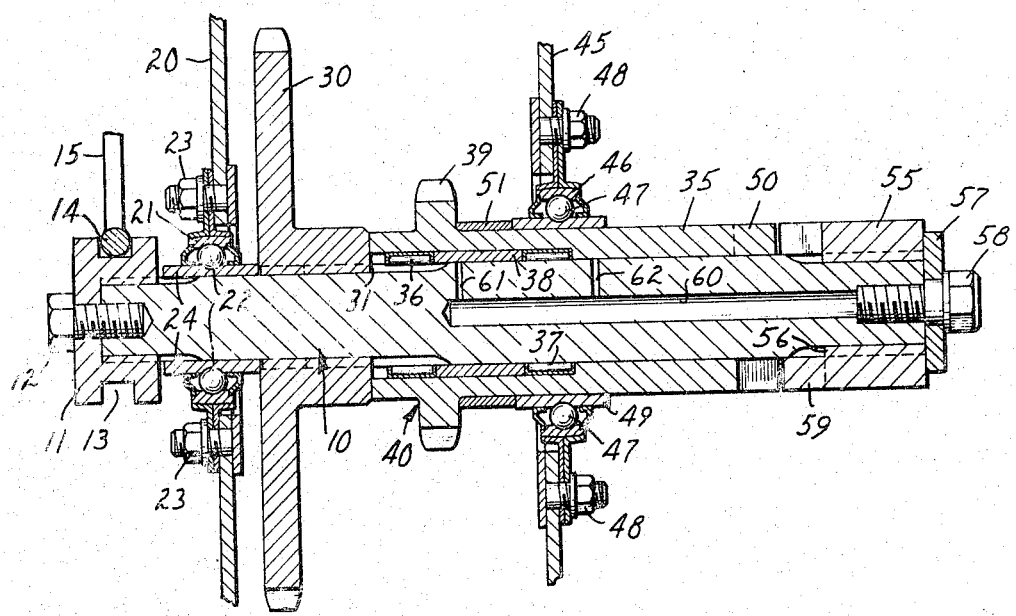
FIG. 2 is an axial sectional view of the present clutch mechanism in the disengaged position, some parts broken away.

A shaft, generally designated 10, has a cup 11 fixedly attached to the left end thereof by some means such as bolt 12 passing through the end of the cup 11 and threaded into the left end of the shaft 10. The cup 11 has a centrally located groove 13 in the outer periphery thereof in which the ends 14 of the bifurcated rod 15 slide. The bifurcated rod 15 is connected to a manual control, not shown, which engages or disengages the clutch mechanism. As will be explained in more detail presently the shaft 10 is mounted for limited axial movement. The ends 14 of the bifurcated rod 15 are engaged in the groove 13 of the cup 11 and when the rod 15 is shifted to the left the shaft 10 is shifted to the left and when the rod 15 is shifted to the right the shaft 10 is shifted to the right.

A stationary frame 20 has a bearing housing 21 containing bearings 22 therein mounted thereon by some means such as bolts 23. A sleeve 24 is slidably mounted on the shaft 10 and rotates with the shaft 10. The bearings 22 in the housing 21 ride on the sleeve 24 and maintain the shaft 10 fixedly positioned with respect to the frame 20 while allowing rotary movement and limited axial movement.

The shaft 10 is rotated at some desired speed by some coupling means such as a sprocket 30. Sprocket 30 is slidably mounted on the shaft 10 to the right of the frame 20 and abutting the sleeve 24. Sprocket 30 is splined to the shaft 10 as designated at numeral 31 and, therefore, when sprocket 30 is driven by means of a motor or the like connected to sprocket 30 by a chain, not shown, the sprocket 30 causes the shaft 10 to rotate therewith. Sprocket 30 is fitted over the shaft 10 loosely so that the axial shifting of the shaft 10 does not move the sprocket 30 axially. It should be understood that while the coupling means is illustrated as a sprocket 30 and couples rotating motion to the shaft 10 the invention would operate if the coupling means were some other device, such as a pulley or the like, and rotating motion was being coupled from the shaft 10.

An elongated hollow, cylindrical sleeve 35 has an inside diameter slightly larger than the outside diameter of shaft 10 and is mounted coaxial therewith by means of bearings 36 and 37. Bearings 36 and 37 encircle the shaft 10 and are axially spaced apart by means of a spacer 38. Bearings 36 and 37 and spacer 38 are fitted into a groove in the inside periphery of sleeve 35 and maintain sleeve 35 rotatable and spaced from shaft 10. Near the left-hand end of sleeve 35 teeth 39 protruding radially outwardly from the outer periphery thereof form a sprocket 40 integral with the sleeve 35. Sprocket 40 is in general the driven sprocket and the device which it is desired to drive is connected to the clutch mechanism by means of a chain, not shown, engaged with sprocket 40. However, it should be understood that sprocket 40 could also be connected to the power source in which case sleeve 35 would be rotating at the desired speed and shaft 10 would be normally stationary. Also, a pulley or the like might be fixedly attached to sleeve 35 in place of sprocket 40.

A frame 45 has a bearing housing 46 with bearings 47 therein fixedly attached thereto by some means such as bolts 48. A sleeve 49 is coaxially mounted on the outer periphery of sleeve 35 for rotation therewith. The bearings 47 in housing 46 travel on the outer surface of the sleeve 49. Thus, the sleeve 35 is mounted for rotation relative to the shaft 10 by means of bearings 36 and 37 and relative to the frame 45 by bearings 47. Mounted on sleeve 35 between sprocket 40 and bearing sleeve 49 is a spacer 51. Spacer 51 and sleeve 24 keep sprocket 30 and sleeve 35 in position during operation of said clutch.

The right-hand end of the sleeve 35 has a plurality of axially extended teeth 50 therein. The axial teeth 50 in sleeve 35 may be seen more clearly by referring to FIG. 4. In the present embodiment the teeth 50 in the sleeve 35 may be produced by simply cutting longitudinal notches therebetween. However, it should be understood that the teeth 50 are means for connecting the sleeve 35 to the shaft 10, as will be explained in more detail later, and may take on a variety of forms while remaining within the scope of the present invention.

A drive cap 55 which is a sleeve having outer dimensions approximately the same as sleeve 35 is splined onto the shaft 10 at 56 to insure rotation of the cap 55 with the shaft 10. The drive cap 55 is retained in axial position on the shaft 10 by means of a washer 57 having a diameter slightly larger than the shaft 10 and attached to the right end of shaft 10 by means of a bolt 58 which is threaded through the washer 57 and into the shaft 10. The inner or left end of the drive cap 55 has a plurality of axial teeth 59 cut therein which are adapted to mesh with the axial teeth 50 in the right end of the sleeve 35. The position of the teeth 59 with respect to the teeth 50 can be seen more clearly in FIG. 4.

In the operation of the present clutch mechanism when the bifurcated rod 15 is pushed to the left the shaft 10 is shifted to the left and the teeth 59 on the drive cap 55 mesh with the teeth 50 on the sleeve 35. Thus, any power source, which is rotating the sprocket 30 and hence shaft 10, will rotate the cap 55 which is fixedly connected to the shaft 10 and, since the teeth on the cap 55 are meshed with the teeth on the sleeve 35, the sleeve 35 and the sprocket 40 fixedly attached thereto will also rotate with the shaft 10. When the bifurcated rod 15 is moved to the right the shaft 10 slides to the right and the teeth 59 on the end of the drive cap 55 are disengaged from the teeth 50 on the sleeve 35. Thus, the rotation of the shaft 10 and the drive cap 55 has no effect on the sleeve 35 and it remains motionless.

A longitudinal passage 60 extending from the right end of the shaft 10 to approximately the central portion thereof is the main passage of a lubricating system for the bearings 36 and 37. A pair of radial passages 61 and 62 extend from the outer periphery of the shaft 10 to the passage 60 and are in communication with the passage 60 at one end while in communication with the bearings 36 and 37 respectively at the other end thereof. In the present embodiment the bolt 58 has a centrally located passage 63 longitudinally therethrough with a lubrication fitting 64 at the outer end thereof. Thus, to lubricate the bearings 36 and 37 the bifurcated rod 15 should be moved to the left so as to move the shaft 10 to the left at which time the bearings 36 and 37 are in communication with the passages 61 and 62 respectively. A lubricant may then be applied to the main passage 60 through the fitting 64 and passage 63 of bolt 58 by means of some pressure source such as a lubricating gun or the like and the lubricant under pressure will pass from the passage 60 through the passages 61 and 62 to the bearings 36 and 37. Thus, the bearings 36 and 37 are positively lubricated and the useful life thereof is greatly extended.

Thus, a clutch mechanism is disclosed the parts of which cooperate to produce a positive action. Also, the parts are so related in their assembly and operation that relatively high manufacturing tolerances may be utilized while still retaining efficient operation. In addition, the present clutch mechanism has a lubricating system which is positive acting and therefore greatly lengthens the useful life of the bearings and, therefore, the over-all clutch mechanism.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:
1. Clutch mechanism comprising:
   (a) a shaft mounted for rotary movement and limited axial movement;
   (b) a longitudinal passageway in said shaft extending from one end of said shaft to the central portion thereof and radial passageways in said shaft connected with said longitudinal passageway and extending to the outer periphery of said shaft;
   (c) coupling means fixedly attached to said shaft for applying rotary motion to said shaft;
   (d) a hollow, cylindrical sleeve having means fixedly attached to the outer periphery thereof for transmitting rotary motion therefrom and further having axially extended teeth positioned about one end thereof;
   (e) bearing means rotatably mounting said sleeve coaxially on said shaft, said bearing means being positioned on said shaft in communication with said radial passageways during at least part of the operation of said clutch;
   (f) connecting means fixedly attached to said shaft and having teeth thereon adapted to mesh with said teeth on said sleeve; and
   (g) means engaging said shaft for moving said shaft axially into a first position in which said teeth on said sleeve mesh with said teeth on said connecting means whereby said sleeve rotates with said shaft and into a second position in which said teeth on said sleeve are separated from said teeth on said connecting means.

2. The clutch mechanism of claim 1 having in addition a lubricating fitting fixedly attached to the end of said shaft in communication with said longitudinal passageway for applying a lubricant under pressure thereto whereby said lubricant is transported by the passageways to the bearing means.

References Cited by the Examiner
UNITED STATES PATENTS 1,725,562  8/1929  Borchert _____ 192—96 X
2,723,735  11/1955  Banker _____ 192—96 X DAVID J. WILLIAMOWSKY, *Primary Examiner.*

A. T. McKEON, *Assistant Examiner.*